(12) United States Patent
Kenna, III et al.

(10) Patent No.: US 7,765,273 B2
(45) Date of Patent: Jul. 27, 2010

(54) METHOD AND APPARATUS FOR DISTRIBUTION OF ELECTRONIC MEDIA

(75) Inventors: Frank Kenna, III, Branford, CT (US); Edward LaFreniere, Clinton, CT (US)

(73) Assignee: The Marlin Company, North Haven, CT (US)

( * ) Notice: Subject to any disclaimer, the term of this patent is extended or adjusted under 35 U.S.C. 154(b) by 1452 days.

(21) Appl. No.: 11/050,093

(22) Filed: Feb. 3, 2005

(65) Prior Publication Data
US 2005/0193346 A1 Sep. 1, 2005

Related U.S. Application Data

(63) Continuation of application No. 09/758,833, filed on Jan. 11, 2001, now abandoned.

(51) Int. Cl.
G06F 15/16 (2006.01)

(52) U.S. Cl. .................. 709/217; 709/223; 709/229; 705/14.68; 370/429; 348/211.3; 348/552

(58) Field of Classification Search .......... 705/27, 705/26, 14.68, 7, 14, 52; 348/207.1, 211.3, 348/552; 370/429; 709/213, 223, 229, 252; 726/4, 8, 30
See application file for complete search history.

(56) References Cited

U.S. PATENT DOCUMENTS

| | | | | |
|---|---|---|---|---|
| 5,625,818 A | | 4/1997 | Zarmer et al. ............... 395/615 |
| 5,970,231 A | * | 10/1999 | Crandall ..................... 709/238 |
| 6,073,119 A | | 6/2000 | Bornemisza-Wahr et al. . 705/42 |
| 6,081,788 A | * | 6/2000 | Appleman et al. ........ 705/14.46 |
| 6,118,449 A | * | 9/2000 | Rosen et al. ................. 715/861 |
| 6,125,388 A | | 9/2000 | Reisman ..................... 709/218 |
| 6,223,027 B1 | | 4/2001 | Ono et al. ................... 455/412 |
| 6,275,854 B1 | * | 8/2001 | Himmel et al. ............. 709/224 |
| 6,314,448 B1 | | 11/2001 | Conner et al. ............... 709/202 |
| 6,317,761 B1 | * | 11/2001 | Landsman et al. .......... 715/205 |
| 6,321,256 B1 | * | 11/2001 | Himmel et al. ............. 709/218 |
| 6,324,553 B1 | | 11/2001 | Cragun et al. ............... 707/513 |
| 6,385,592 B1 | | 5/2002 | Angles et al. ................. 705/14 |
| 6,415,291 B2 | | 7/2002 | Bouve et al. ................. 707/10 |
| 6,438,588 B1 | * | 8/2002 | Crandall ..................... 709/217 |
| 6,462,654 B1 | | 10/2002 | Sandelman et al. ......... 340/506 |
| 6,477,575 B1 | * | 11/2002 | Koeppel et al. ............. 709/224 |
| 6,519,584 B1 | | 2/2003 | Tognazzini et al. ............ 707/3 |
| 6,519,651 B1 | * | 2/2003 | Dillon ........................ 709/250 |
| 6,535,123 B2 | | 3/2003 | Sandelman et al. ......... 340/506 |
| 6,591,247 B2 | * | 7/2003 | Stern ....................... 705/14.52 |
| 6,701,143 B1 | | 3/2004 | Dukach et al. ........... 455/414.2 |
| 6,721,713 B1 | * | 4/2004 | Guheen et al. ................. 705/1 |
| 6,721,955 B2 | * | 4/2004 | Khoo et al. ................... 725/46 |
| 6,725,203 B1 | | 4/2004 | Seet et al. ..................... 705/14 |
| 6,957,186 B1 | * | 10/2005 | Guheen et al. ................. 705/1 |
| 6,995,789 B2 | * | 2/2006 | McIntyre et al. .......... 348/207.1 |

(Continued)

*Primary Examiner*—Andrew Joseph Rudy
(74) *Attorney, Agent, or Firm*—St. Onge Steward Johnston & Reene LLC (57) ABSTRACT

A method and apparatus for distribution of electronic media replace the display of printed employee communications with a method and apparatus for distribution of electronic media. In a typical embodiment of the invention, electronic media replaces the posters and printed materials and the conventional bulletin board is replaced by an electronic display. Maintaining the employee communications in electronic form from creation to display significantly reduces and cost while dramatically improving the flexibility of an employee communications program.

13 Claims, 5 Drawing Sheets

U.S. PATENT DOCUMENTS

| | | | |
|---|---|---|---|
| 6,999,111 B2 * | 2/2006 | McIntyre et al. | 348/207.1 |
| 7,050,989 B1 * | 5/2006 | Hurt et al. | 705/14 |
| 7,069,271 B1 * | 6/2006 | Fadel et al. | 707/102 |
| 7,130,807 B1 * | 10/2006 | Mikurak | 705/7 |
| 7,149,698 B2 * | 12/2006 | Guheen et al. | 705/1 |
| 7,155,663 B2 * | 12/2006 | Landsman et al. | 715/200 |
| 7,240,025 B2 * | 7/2007 | Stone et al. | 705/26 |
| 7,243,153 B2 * | 7/2007 | McIntyre et al. | 709/229 |
| 7,313,622 B2 * | 12/2007 | Lee et al. | 709/227 |
| 7,398,318 B2 * | 7/2008 | McIntyre | 709/229 |
| 7,451,467 B2 * | 11/2008 | Carver et al. | 725/34 |

* cited by examiner

METHOD AND APPARATUS FOR DISTRIBUTION OF ELECTRONIC MEDIA

CROSS REFERENCE TO RELATED APPLICATIONS

This application is a continuation of application Ser. No. 09/758,833, filed Jan. 11, 2001 now abandoned.

BACKGROUND OF THE INVENTION

1. Field of the Invention

The present invention relates generally to employee communication programs, and, more particularly, to a method and apparatus for publishing and distributing employee communications.

2. Description of the Related Art

Modern business management calls for effective communications between management and employees. Among various other techniques for communicating with employees, conventional employee communication programs have typically included providing a bulletin board upon which printed material, e.g., posters including photographs, artwork, designs and/or slogans, and messages are displayed. Topics that may be the subject of employee communications involve safety, quality, teamwork, morale and self-motivation. For example, since safety is an important consideration in most working environments, a poster with a slogan relating to the exercise of caution in potentially dangerous situations may be displayed for impressing upon employees an employer's requirement for observing on-the-job safety. Other examples of representative employee communications include news releases about the company, messages for boosting employee morale and messages relating to employee activities.

In conventional systems to which the invention relates graphic designers may develop the posters and other employee communications by hand or on a computer aided design system. Typically, they are printed as a large employee communication for display and then sent to a client for mounting to a bulletin board. The bulletin board may be relatively sophisticated and creatively organized for efficiency and visual attention, such as a three-panel bulletin board on the order of 26 inches (66 centimeters) by 63 inches (160 centimeters). For conventional systems to which the invention relates the posters are typically manually replaced to communicate corporate goals, news of interest and employee activities to employees.

At regular time intervals, such as once a month, clients may select new posters and messages and/or the new posters and messages are automatically selected, printed and shipped periodically to each client. Because of the large number and variety of clients and the specific requirements for certain users, there are significant inefficiencies associated with selecting, printing and shipping the employee communications. Also, achievement of a high degree of customization and selectivity is economically problematic.

Accordingly, it is desired to provide an efficient system that overcomes many of the deficiencies of prior art systems and services.

SUMMARY OF THE INVENTION

Briefly stated, the invention in a preferred form replaces the display of printed employee communications with a method and apparatus for distribution of electronic media. In a typical embodiment of the invention, electronic media replaces the posters and printed materials and the conventional bulletin board is replaced by an electronic display. Maintaining the employee communications in electronic form from creation to display significantly reduces and cost while dramatically improving the flexibility of an employee communications program.

An apparatus embodying the claimed method may be described as an electronic communication display system configured for transmitting data corresponding to media to one or more remote client locations where the media is displayed. The electronic communication display system comprises an electronic display for displaying media, and a client server that receives data corresponding to the media for display. A web server capable of communicating with the client server for transmission of data thereto is also provided. The web server along with an application server communicating with the web server formulates the data for ultimate transmission to the client server.

It is envisioned that a provider of workplace communications will maintain the web server and applications server. The provider will also design and store various electronic employee communications suitable for a variety of business types, e.g., manufacturing, sales, service, etc. The electronic employee communications may be provided to businesses as a subscription service. A subscriber is provided with the electronic display and client server for display of electronic employee communications produced by the provider. The subscriber provides information about his business to the provider to aid the provider in producing pertinent electronic employee communications. The subscriber is granted limited access to the provider's application server to enable the subscriber to choose and/or alter the electronic employee communications delivered to the electronic display.

In a basic configuration, the electronic communication display system comprises two computers, a main computer at the provider and a client computer at a subscriber-designated remote location. The main computer stores electronic employee communications, sorts and keeps track of each subscriber's order. Each remote location of the system has a client server that is hooked up to the Internet and to an electronic display. The client server polls the main server on a regular basis and retrieves an updated assortment of employee communications in electronic form, which are then displayed on the electronic display. The electronic display may be configured to also show regularly updated news, weather and sports information, if desired by the subscriber.

In one particular embodiment of the invention, the client server has a web browser configured in kiosk mode for display of the media. The web browser may contain a plurality of channels wherein each of the channels contains an electronic poster or an electronic message.

Another preferred form of the invention involves a method of providing customized employee communications in electronic form to a plurality of remote subscriber locations and comprises the steps of:

creating employee communication collections containing several electronic employee communications for each subscriber;

posting the employee communication collections on a server connected to the Internet;

permitting subscriber access to the server and allowing the subscriber to:

view one or more of the employee communication collections;

alter the content of the one or more employee communication collections by:

adding or deleting particular electronic employee communications;

modifying the content of one or more electronic employee communications; and/or creating a new electronic employee communication for inclusion in the employee communication collection;

delivering the employee communication collection to one or more remote subscriber locations designated by the subscriber; and displaying the employee communication collection on one or more electronic displays designated by the subscriber.

As used in this application, the term "deliver" shall be understood to encompass both transmitting, downloading and uploading, or any combination thereof. Transmitting information does not typically require a request for the information. In contrast, downloading or uploading typically involve a request by the computer seeking the data.

An object of the present invention is to provide an apparatus for distribution of electronic media capable of electronically transferring employee communications generated at a provider location to a plurality of remote subscriber locations.

Another object of the present invention is to provide an apparatus for distribution of electronic media that enables both the provider and the subscriber to easily customize the content of employee communications and increases the variety of materials available for inclusion in employee communications.

A further object of the present invention is to provide a method for distribution of electronic media in which employee communications are efficiently produced at a provider location, customized by a subscriber and delivered to the subscriber in electronic form for display at remote subscriber locations.

BRIEF DESCRIPTION OF THE DRAWINGS

Other objects and advantages of the present invention will become apparent from the specification and drawings wherein.

DETAILED DESCRIPTION OF THE PREFERRED EMBODIMENTS

Figure 1:
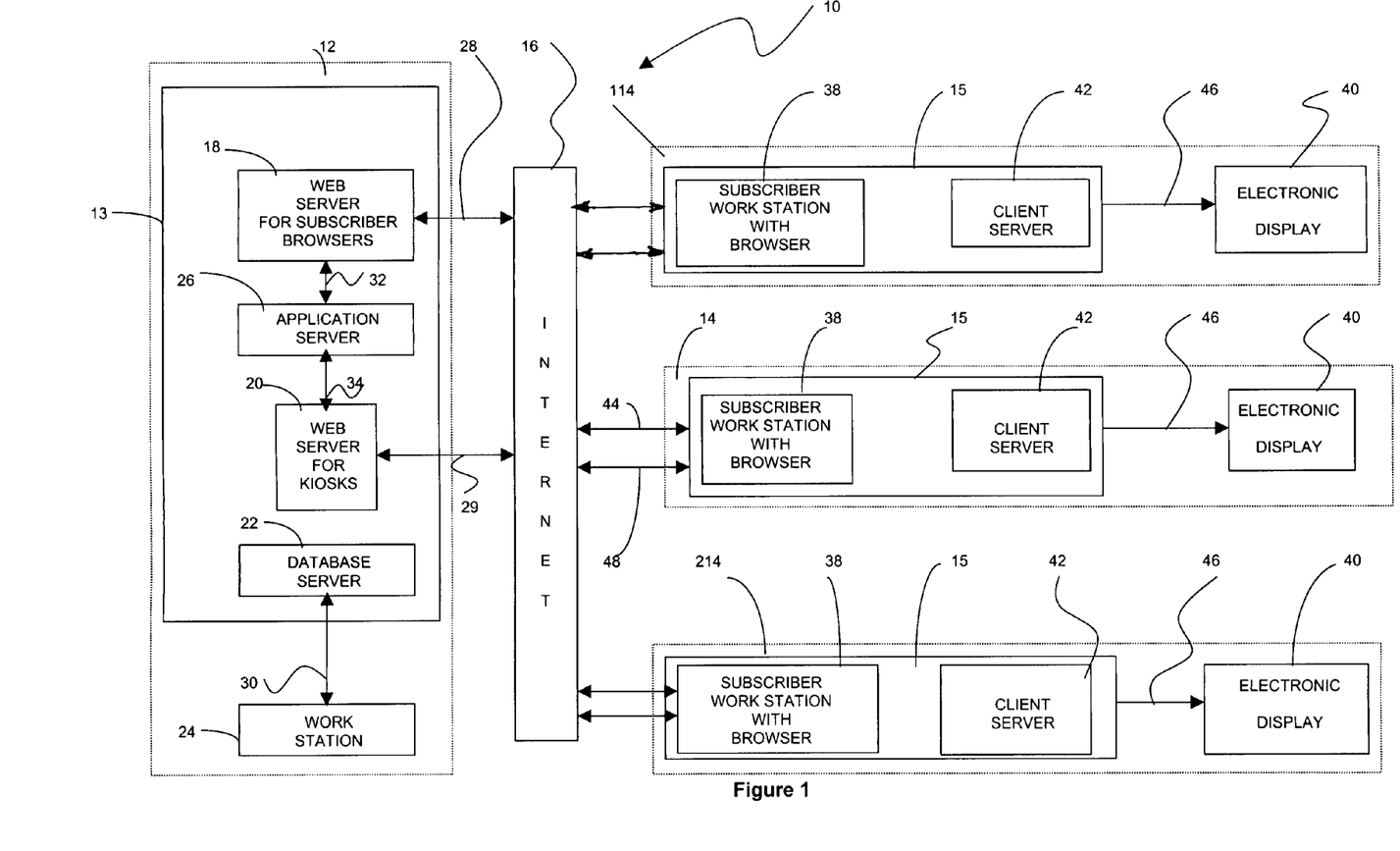
FIG. 1 is a schematic diagram of an apparatus for distribution of electronic media according to aspects of the present invention.

One embodiment of an apparatus for distribution of electronic media according to the present invention is schematically illustrated in FIG. 1 and generally designated by the numeral 10. The apparatus for distribution of electronic media 10 facilitates electronic transmission of employee communications from a primary location to one or more remote subscriber locations. The employee communications may take the form of a "poster" as that term is commonly understood, where the poster is created and maintained in electronic form. A typical electronic poster may include text and graphics arranged to be visually attractive and convey information pertinent to a subscriber's business, workplace or employees. The subject matter of the employee communications may involve safety, quality, teamwork, morale, self motivation, subscriber news releases, employee activities and the like.

The term "employee communication" as used herein is intended to include all forms of visual communication including graphics, written and printed text along with photographs, visual works and artistic material displayed either alone or in any combination. Particular employee communications may take the form of an "electronic poster" as described above.

The apparatus for distribution of electronic media 10 comprises a main server system 12 located at a primary location and a multiplicity of client or subscriber communication and display systems 14, 114, 214 located at each remote subscriber location. The subscriber communication and display systems 14, 114, 214 communicate with the main server system 12 via the Internet 16, or other suitable communications pathway.

The main server system 12 comprises a computer 13 configured to function as a first web server 18, a second web server 20, a data base server 22, and an application server 26. While the main server system 12 is described in terms of several services and server functions, a single computer 13 may be configured to provide all functions and incorporate all described services. The computer 13 may be any commercially available server such as those manufactured and marketed by the Compaq Corporation and may be connected to the Internet 16 via line 28 in a well-known manner. The first web server 18 is configured to be accessible by one or more subscriber work stations 38 to allow subscribers to modify the content of the employee communications.

The second web server 20 may be similar to web server 18 although modified to communicate via communication line 29 with one or more client servers 42. It will be understood that while two web servers 18 and 20 are provided, one web server performing both functions may be employed instead.

The database server 22 stores subscriber information such as subscriber identification, business type, routing information and media data such as employee communication collections developed at a workstation 24 and as modified by the application server 26 as discussed below. Numerous workstations 24 may be employed. Each workstation 24 is configured so that a graphic designer may develop electronic employee communications (which may take the form of electronic posters) and collect them together into employee communication collections which may contain, for example, collections of electronic posters and messages for a particular subscriber. The employee communications are created at the workstation 24, using software such as Adobe Photoshop™ or Adobe Illustrator™. The electronic employee communications are then sent to application server 26 where they are organized by edition and subscriber. The work station 24 communicates with the data base server 22 represented by communication line 30 to transmit various electronic employee communications, etc., which are developed at the work station 24 in a conventional manner. The electronic employee communications are converted into an appropriate format for transmission over the Internet 16, such as file transfer protocol (FTP), and then stored before transfer to a client communication and display system 14.

The application server 26 communicates with both the first and second web servers 18, 20 represented by communication lines 32 and 34 and with the data base server 22 via communication line 36. The application server 26 provides coordination between the web servers 18 and 20 and allows access to the electronic poster kits contained in data base server 22. The application server 26 includes application software that tracks and distributes content according to subscriber data and as modified by subscribers according to the method of the present invention.

The client communication and display system 14 comprises a computer 15 that may include a client workstation 38, a client server 42, and an electronic display 40. The client workstation 38 communicates with the web server 18 via communication lines 28 and 44 and the Internet 16. The client workstation 38 preferably comprises a web browser sold under the trademark EXPLORER by the Microsoft Corporation of Redman, Wash. Optionally, other web browsers, such as that sold under the trademark NETSCAPE by the Netscape Communications Corporation of Mountain View, Calif., may be employed. The client work station 38 interactively communicates with web server 18 to transmit subscriber input, for example to modify an employee communication collection and receive an updated version of the employee communication collection.

The electronic display 40 may be any suitably large electronic display but is preferably a large flat panel gas plasma display, such as those manufactured and sold by the Sony corporation of Japan.

The client server 42 receives employee communication collections (alternatively referred to as electronic poster kits) in the form of data in a particular format, for display on the electronic display 40. The client server 42 is illustrated as being connected to the electronic display 40 by a communication line 46. It will be appreciated that the computer 15 may be located on a housing supporting the electronic display 40, but is preferably separated some distance therefrom. In any event, the client server 42 communicates with the web server 18 via communication lines 29 and 44 and the Internet 16. The client server 42 preferably comprises a web browser, which is configured in a kiosk mode whereby the browser receives data from the web server 18 and generates a continuous display. In particular, it will be understood that a number of channels of the web browser may be used to simultaneously display various elements of the employee communications collection for varying amounts of time.

Figure 4:
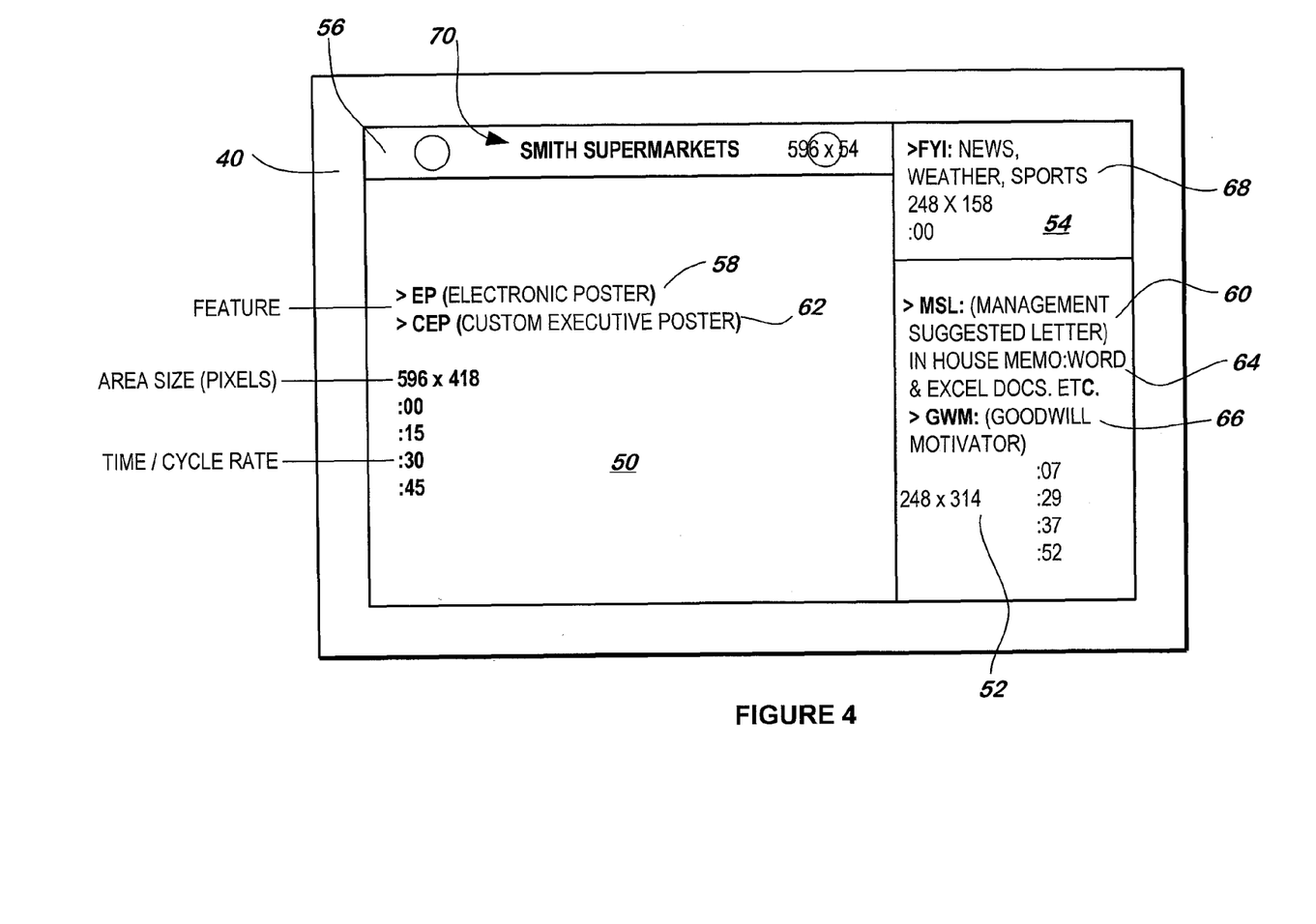
FIG. 4 is an annotated diagram of a representative electronic display compatible with the apparatus and method of the present invention.

Referring now also to FIG. 4, the client server 42 communicates employee communication collections (electronic poster kits) to the electronic display 40 for display. Preferably, the electronic display 40 may comprise a plurality of sections for displaying different materials. For example, four separate sections 50, 52, 54 and 56 may be provided—each of which may be functioning simultaneously and at different update times and periods. Each section may sequentially display varying messages and/or posters, slogans, etc. For example, in section 50 an electronic poster 58 may be displayed for fifteen (15) minutes and then switch to a custom executive poster 62. Section 52 may display, concurrently with the employee communications displayed on section 50, an employee communication 64, then switch to a Good Will Motivator™ media 66 and thereafter switch to a management suggested letter 60. The relative timing may also be selected. For example, messages 64 and 66 may alternate every fifteen (15) minutes and may start seven and one half (7.5) minutes after the electronic poster 58 is initially displayed in section 50. Section 54 may display news or announcements such as news headlines, sports scores and local 3 or 5-day weather forecasts. The electronic display 40 may include media such as a client's name or trademark, etc. as illustrated at 70, which may be permanently affixed thereto. It will be appreciated that each of the communication lines 28, 29, 44 and 48 may comprise, for example, telephone, satellite or wireless connection.

Operation

Figure 2:
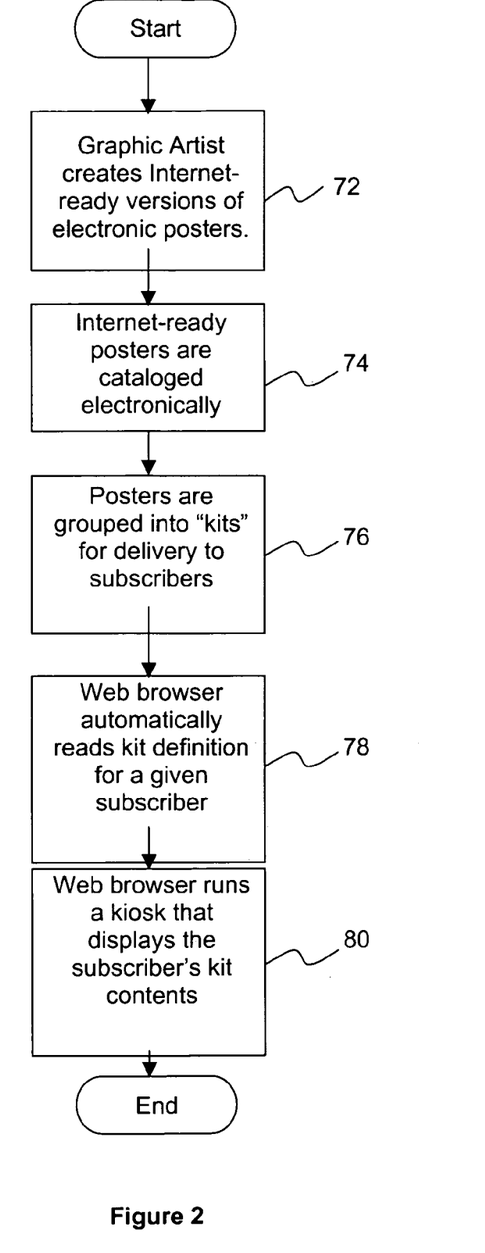
FIG. 2 is a partial flow diagram for a method of distributing electronic media compatible with the apparatus of FIG. 1 and according to aspects of the present invention.
Figure 3:
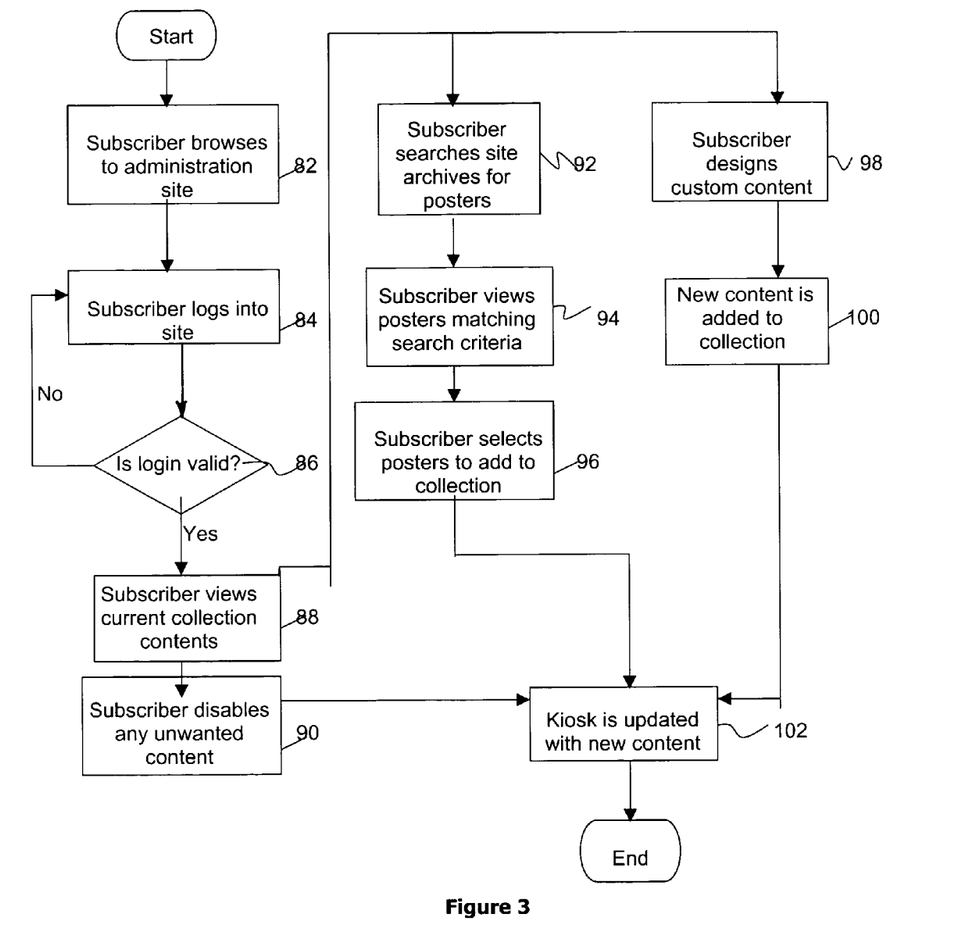
FIG. 3 is a further partial flow diagram for a method of distributing electronic media compatible with the apparatus of FIG. 1 and according to aspects of the present invention.

With reference to FIGS. 1, 2 and 3, a graphic artist using work station 24 creates an employee communication in electronic form that is compiled into an employee communications collection in a data format, as discussed above, that is suitable for transmission over the Internet as shown in box 72. The electronic employee communications are cataloged and stored in the data base server 22. See box 74.

The application server 26 and workstation 24 function to group electronic employee communications by topic and edition. The electronic employee communications may also be compiled into employee communications collections arranged by, for example, a particular subscriber or subscriber type such as retail or manufacturing subscribers. See box 76. For example, the subscribers of systems 14 and 114 may have access only to one set of poster kits while the subscriber of system 214 has access only to a different set of posters. The application server 26 is also configured to indicate the last time and date that revisions or updates have been made to the employee communication collections.

Each subscriber may modify these collections using a subscriber workstation 38. The subscriber may select specific electronic employee communications (electronic posters) for display on the electronic display 40. Thereafter, the client server 42 communicates the electronic employee communications to the electronic display 40 as described above for display. See box 80. The subscriber can query through the web browser to determine the latest times and dates of poster kit changes.

Figure 5:
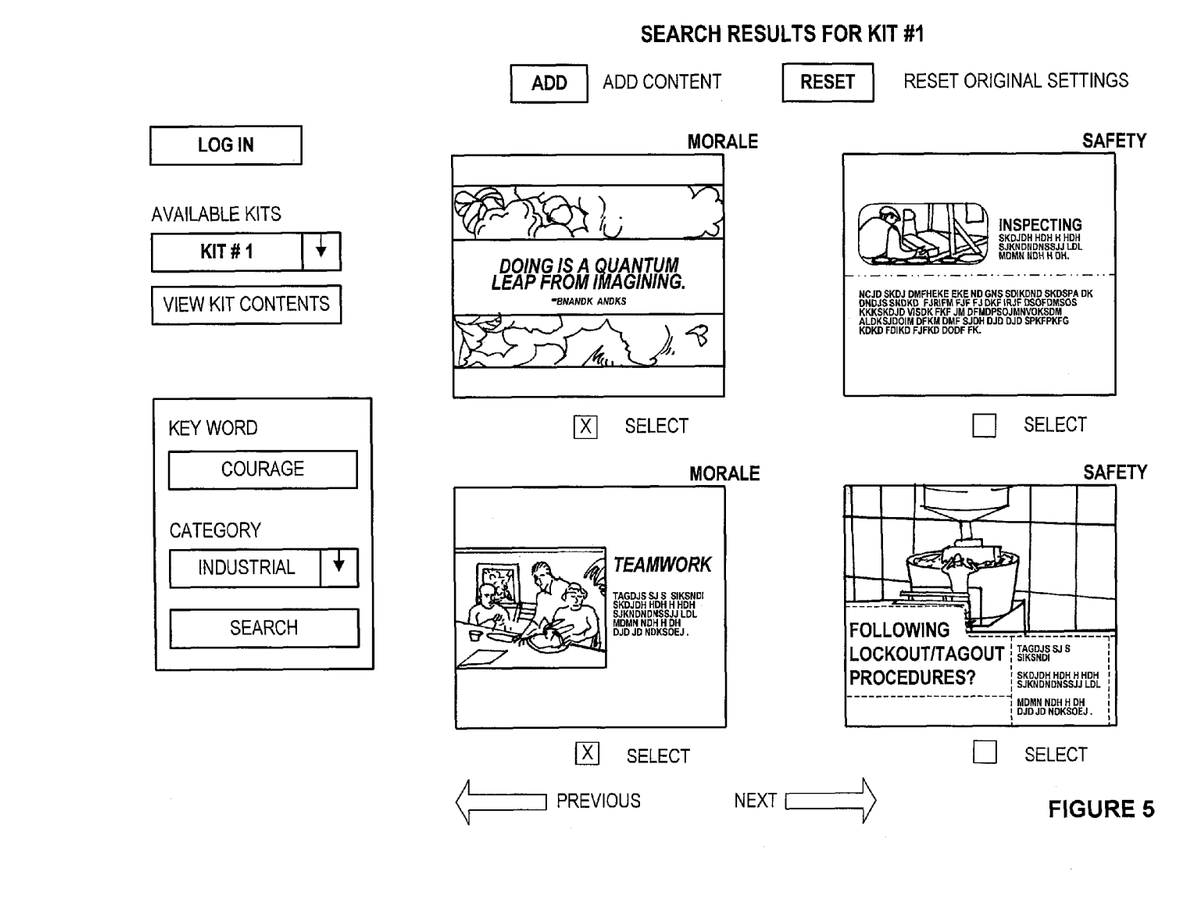
FIG. 5 is a representative screen generated by application software, which a subscriber may use in connection with the apparatus and method of the present invention.

The subscriber may also modify the contents of an employee communication collection as follows. Using a subscriber workstation 38, the subscriber contacts the web server 18 (see box 82 and 84) and logs onto the web server 18. After checking for proper password and client ID, (see 86), the subscriber is allowed to view the current employee communication collection contents at 88. The subscriber may then choose between different options. The subscriber may search for electronic employee communications by topic, for example, electronic posters with themes such as safety, attitude, cooperation, etc. The subscriber may remove any unwanted electronic posters or other content at 90. The subscriber may also search, using the application server 18, to select a particular electronic poster or posters and add each selected electronic poster to the employee communications collection at 92, 94 and 96. The subscriber may have access to various screens such as screen 200 (FIG. 5) to facilitate the search and selection. Optionally, the subscriber may design its own electronic poster content within the application or simply provide electronic material for display—all of which may be added to the employee communications collection at 98 and 100. Once a subscriber has completed the modification, the application server 26 makes the updated employee communications collection available. Accordingly, when the client server 42 polls the web server 18, new media data is downloaded for display on the electronic display 40 as represented at box 102.

While the present invention has been described in connection with what are presently considered to be the most practical and preferred embodiments, it is to be understood that the present invention is not limited to the disclosed embodiments. Rather it is intended to cover all of the various modifications and equivalent arrangements including within the spirit and scope of the appended claims.

What is claimed is:

1. A method of distributing electronic media to subscribers for display at remote subscriber locations, said method comprising:
   (a) creating a plurality of employee communication collections each containing at least one electronic employee communication comprising text and graphics arranged to convey a message from the subscriber pertinent to a subscriber's business;
   (b) posting said employee communication collections on a server accessible by the Internet;
   (c) initiating a subscription service for electronic delivery of a selected employee communication collection to the subscriber;
   (d) permitting subscriber access to said server over the Internet, said access allowing the subscriber to:
      (i) view one or more of said selected employee communication collections; and/or
      (ii) alter the content of said one or more selected employee communication collections by:
         (1) adding or deleting particular electronic employee communications;
         (2) modifying the content of one or more of said electronic employee communications; and/or
         (3) creating a new electronic employee communication for inclusion in said one or more selected employee communication collections;
   (e) delivering said selected employee communication collection over the Internet to one or more remote subscriber locations designated by the subscriber; and
   (f) displaying said selected employee communication collection on one or more electronic displays designated by the subscriber, wherein at least one said electronic display comprises a plurality of sections for displaying different electronic employee communications and said step of displaying comprises: simultaneously displaying a subset of said plurality of electronic employee communications on at least one of said one or more electronic displays and displaying news information on a portion of said screen contemporaneously with at least one electronic employee communication:
   (g) selecting a time duration for display of electronic employee communications on each of said plurality of sections.

2. The method of distributing electronic media of claim 1, wherein said step of permitting subscriber access to said server comprises: identifying each subscriber and limiting said identified subscriber's access to said selected employee communication collections as a function of the identified subscriber.

3. The method of distributing electronic media of claim 1, comprising: designating a default employee communications collection for each subscriber; delivering said default employee communication collection over the Internet in the absence of subscriber access to said server for a pre-determined time interval; and displaying said default employee communications collection on one or more electronic displays designated by the subscriber.

4. The method of distributing electronic media of claim 1, comprising: incorporating a client server into at least one of said one or more electronic displays; and configuring the subscriber server to poll said server to prompt said step of delivering.

5. The method of distributing electronic media of claim 1, wherein said step of delivering comprises periodically polling said server from said remote subscriber location; and downloading updated employee communication collections at the remote subscriber location; and said step of displaying comprises displaying said updated employee communication collections on one or more electronic displays designated by the subscriber.

6. The method of distributing electronic media of claim 1, comprising: selecting a different time duration for display of electronic employee communications on each of said plurality of sections.

7. The method of distributing electronic media of claim 1, wherein said step of displaying comprises: changing the electronic employee communication displayed on said screen according to a pre-determined time sequence.

8. The method of distributing electronic media of claim 7, wherein said access allows the subscriber to change said pre-determined time sequence.

9. The method of distributing electronic media of claim 1, comprising: continuously displaying contemporaneous information on said screen.

10. The method of distributing electronic media of claim 1, comprising: receiving criteria from said subscriber for use in said step of creating; and organizing said electronic employee communications into said employee communication collections according to said criteria.

11. The method of distributing electronic media of claim 1, wherein said step of permitting includes identifying said subscriber and said method comprises: limiting access by said identified subscriber to employee communication collections organized according to criteria gathered from said identified subscriber.

12. The method of distributing electronic media of claim 1, wherein if said subscriber does not access said server to produce a customized employee communication collection for a pre-established time interval, said method comprises: delivering a default employee communication collection to said remote subscriber location; and displaying said default employee communication collection on the one or more electronic displays designated by the subscriber.

13. The method of distributing electronic media of claim 10, comprising: employing said criteria to generate a default employee communications collection if said subscriber does not access said web site for a pre-established period of time; delivering said default employee communications collection to said remote subscriber location; and displaying said default employee communications collection on the one or more electronic displays designated by the subscriber.

* * * * *